United States Patent
Pham et al.

[19]

[11] Patent Number: 5,886,846
[45] Date of Patent: Mar. 23, 1999

[54] METHOD FOR APPLYING OPTIMAL SEEKING TECHNIQUE TO DISK FILE WITH EXCESSIVE REPEATABLE RUNOUT

[75] Inventors: Ich Pham, San Jose; David Drouin, Milpitas; Evelyn Howard, San Jose, all of Calif.

[73] Assignee: Syquest Technology, Inc., Fremont, Calif.

[21] Appl. No.: 655,916

[22] Filed: May 31, 1996

Related U.S. Application Data

[63] Continuation-in-part of Ser. No. 615,076, Mar. 13, 1996, abandoned.

[51] Int. Cl.$^6$ .................................................. G11B 5/596
[52] U.S. Cl. ..................................... 360/78.04; 360/77.04
[58] Field of Search ........................... 360/78.14, 78.04, 360/77.08, 77.07, 77.04, 77.02

[56] References Cited

U.S. PATENT DOCUMENTS

| | | | |
|---|---|---|---|
| 5,402,280 | 3/1995 | Supino | 360/77.04 X |
| 5,404,253 | 4/1995 | Painter | 360/77.04 |
| 5,444,583 | 8/1995 | Ehrlch et al. | 360/78.09 |
| 5,550,685 | 8/1996 | Drouin | 360/77.08 |
| 5,585,976 | 12/1996 | Pham | 360/77.04 |
| 5,617,388 | 4/1997 | Ishioka et al. | 360/77.04 X |

Primary Examiner—Aristotelis M. Psitos
Assistant Examiner—James L. Habermehl
Attorney, Agent, or Firm—Lyon & Lyon LLP

[57] ABSTRACT

A method for applying an optimal seeking technique to a disk file with excessive repeatable runout includes a method of modifying a control signal for a rotary actuator arm of a disk drive. The control signal is modified during track seeking by adding a runout state that is calculated each time a servo sector of a target data track on a surface of a disk is sampled by read/write heads carried by the actuator arm. A calibration algorithm can be used during track following to determine runout magnitude and runout phase at various preselected calibration tracks on the surface of the disk. A seeking algorithm can be implemented to compensate for the relative runout magnitude and phase variations between present and target tracks.

11 Claims, 5 Drawing Sheets

Fig. 6

METHOD FOR APPLYING OPTIMAL SEEKING TECHNIQUE TO DISK FILE WITH EXCESSIVE REPEATABLE RUNOUT

CROSS-REFERENCE TO RELATED APPLICATION

This application is a continuation-in-part of application Ser. No. 08/615,076, filed Mar. 13, 1996, now abandoned.

BACKGROUND OF THE INVENTION

1. Field of the Invention

The present invention pertains to the field of disk drives, and more particularly to a method for applying an adaptive seeking algorithm to a removable cartridge disk file with excessive repeatable runout.

2. Background

In a removable cartridge disk drive, the read/write heads, or transducers, of the drive must float directly above the centerline of any data track being accessed on the surface of the disk contained in the cartridge. Mechanical imperfections and geometric constraints cause the transducers to stray from track center, giving rise to a phenomenon known in the industry as repetitive runout. Repetitive runout occurs for several reasons, including repeatable bearing runout, imbalance between the rotating hub assembly and the disk, and disk clamping errors. Disk clamping errors, for example, are specific to removable media disk drives.

Imperfections such as the above create a variance between the center of the hub on which the disk sits and the center of rotation of the disk.. This gives rise to a repeatable tracking error at the rotational frequency. Additionally, in a disk drive with a rotary actuator arm, the repeatable runout magnitude and phase vary with the position of the actuator arm. Further, repeatable runout can be time variant because the aforementioned imbalances can change or the disk can slip during normal operation.

Conventional disk drives use digital servos with high bandwidths to compensate for repetitive runout. This is effective for runout on the order of a fraction of a track. However, removable cartridge disk drives generally experience runout approaching several tracks. This is known as excessive repeatable runout. The conventional servo cannot compensate for excessive repeatable runout without sacrificing seeking performance.

A least mean square technique has been used to adjust tap weights for every servo sample based on the measured position signal. The method requires sine and cosine functions for tap weight adjustment and feed forward control signal calculation. Approximately one revolution of the disk is required for the tap weights to be adapted to the correct values for minimizing tracking error so that the drive can perform read/write operations. However, the runout adaptation time increases the settling time, causing access time to double. Moreover, the method alleviates track following error only; it ignores track seeking performance.

Another known technique is to use discrete Fourier transforms (DFTs) to identify the magnitude and phase of the repeatable runout. During calibration the microprocessor collects the position-error-signal data for several revolutions. The DFT calculation is then performed and the results are used to form the repeatable runout correction signal, which is stored for subsequent use during normal operations. The DFT procedure can be repeated continuously while the drive is track following and not engaged in read/write functions. The disadvantage of this technique is that it is slow, requiring several revolutions to derive the repeatable runout correction signal. The technique is also calculation intensive. A typical disk drive with sixty servo sectors per revolution requires 120 multipliers and 119 adders to generate the DFT results from one revolution of the position-error-signal data. This mandates that an expensive microprocessor be used—an inadequate solution in the competitive disk drive industry.

Alternatively, a slower microprocessor could be used with the DFT calculation performed only at selected tracks; the DFT results would then be used to form the feed forward signal during normal operation. This technique would compensate for runout error dependent on the actuator position. However, the time-variant runout could not be addressed because the DFT would be based on prior runout information.

Another known method increases the typical disk drive state estimator from a third-order to a fifth-order model, which includes not only head position, head velocity, and bias torque, but also first and second runout states. The fifth-order state estimator can be used in either a hybrid runout compensator technique or a real time state space technique. In the hybrid technique, the fifth-order estimator is used during calibration to obtain runout correction values, which are stored in random access memory to be used in subsequent read/write operations. Because the fifth-order estimator is not used during normal operation, the dynamic can be selected to be relatively slow to avoid undue sensitivity of the estimator's performance due to the uncertainty in the measured position. The hybrid technique is less calculation-intensive than the DFT method, but it too is slow and unadaptive.

The real time state space technique is adaptive, but the fifth-order state estimator model is highly sensitive to noise. As the head moves across the track boundary during seeking, the error in the measured position can approach one-half of the track width—typically higher than the runout magnitude without correction. At least one-half of a revolution would have to take place before the runout magnitude and phase could be compensated for.

Another disadvantage of a fifth-order estimator is that the model attempts to estimate the unknown runout and bias torque simultaneously, using only one input: the estimator error. This disadvantage can be overcome by choosing fast estimator poles for estimated position, velocity, and first and second runout states, but using a slower estimator pole for the estimated bias torque. However, such a design is inappropriate for the typical disk drive servo, which must perform well under a wide variety of conditions. For example, if the actuator bearing were to hit a small particle during arrival at the target track, the transient response—which is dominated by the bias estimator pole—would be too slow.

Another disadvantage of a fifth-order estimator model is that the extra calculation required (as compared to a conventional third-order model) generates more quantization error and reduces system throughput. This would be problematic in the disk drive industry because the typical low-cost disk drive uses only one microprocessor to process both servo and interface controller codes.

Based on the foregoing, there is a need for a method of calibration and seeking that (1) modifies the control signal during seeking, (2) determines the runout magnitude and phase at various tracks, and (3) compensates for the relative magnitude and phase variations between the originated and target tracks.

SUMMARY OF THE INVENTION

The present invention is directed to a calibration and seeking method that (1) modifies the control signal during seeking, (2) determines the runout magnitude and phase at various tracks, and (3) compensates for the relative magnitude and phase variations between the originated and target tracks. To these ends, a method for applying an optimal seeking technique to a disk file with excessive repeatable runout during servo seeking of a target data track by a read/write head of a disk drive includes the steps of continually calculating a runout state of the target data track and using the calculated runout state to modify a servo control signal to compensate for runout error.

In a separate aspect of the invention, runout magnitude and runout phase are determined at various preselected data tracks. Advantageously, runout magnitude and runout phase are then determined at the target data track by interpolation. Preferably, compensation can be made for relative variation between the runout magnitude and phase at the present track and the runout magnitude and phase at the target track. Other features, aspects, and advantages of the present invention will become better understood with reference to the following description and accompanying drawings.

DETAILED DESCRIPTION OF THE PREFERRED EMBODIMENTS

Figure 1:
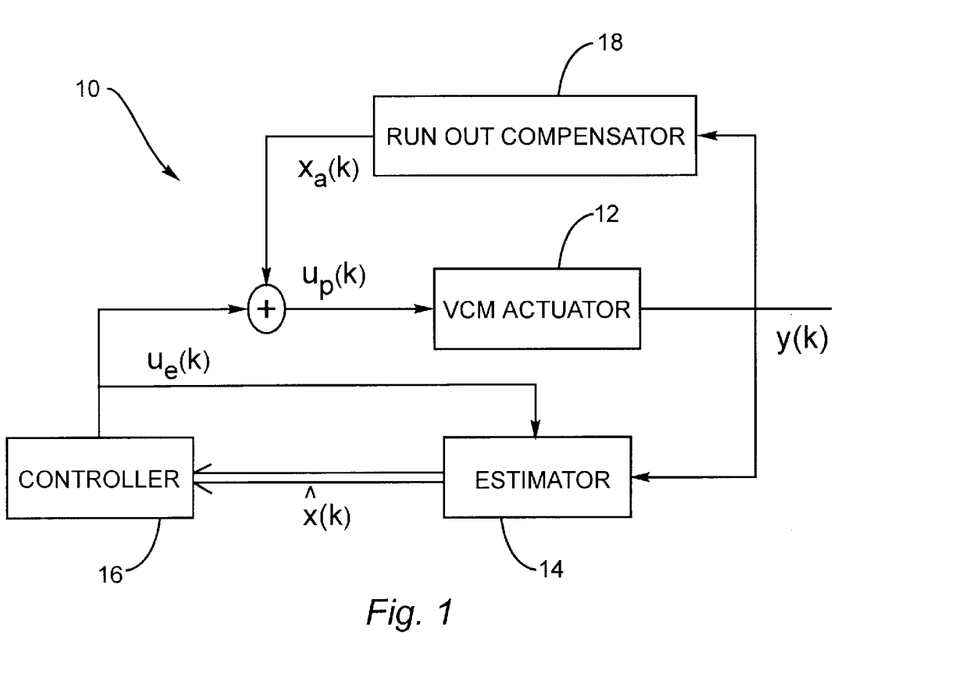
FIG. 1 is a simplified block diagram of a servo seeking system.

Turning in detail to the drawings, FIG. 1 illustrates a simplified block diagram of a servo seeking system 10 within a disk drive for a disk file with repeatable runout (RRO) that is constant across the surface of the disk. The voice-coil motor (VCM) actuator block 12 of FIG. 1 is known in the art. A power amplifier control signal $u_p(k)$ is fed into the VCM actuator block 12. A digital-to-analog converter circuit inside the VCM actuator block 12 converts the control signal $u_p(k)$ to an analog signal which is applied to a power amplifier inside the VCM actuator block 12 to generate a current to control the VCM. The VCM then generates a mechanical torque to rotate an actuator arm within the disk drive.

Figure 2:
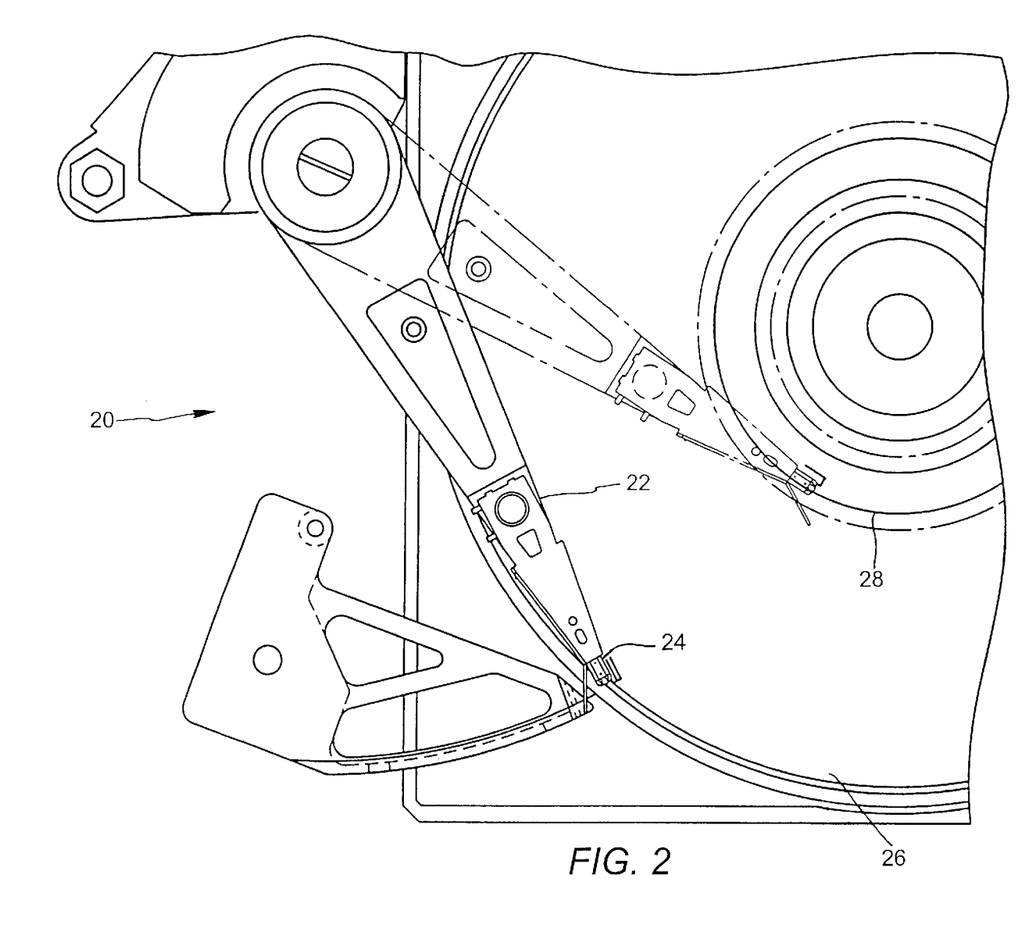
FIG. 2 is a partial plan view of a rotary actuator arm of a disk drive.

As shown in FIG. 2, which depicts a partial plan view of a disk drive 20, the actuator arm 22 carries a read/write head 24, or transducer, over a surface of the disk 26 to a concentric target data track 28 on the surface of the disk 26 to carry out read/write operations. With reference to FIG. 1, the VCM actuator block 10 generates a position output y(k) specifying the position of the read/write head relative to the centerline of the target data track. The position y(k) is a combination of a digital grey code track number and a fraction of the track provided by a position error signal (PES) of an analog-to-digital converter circuit (A/D) (not shown).

Figure 3:
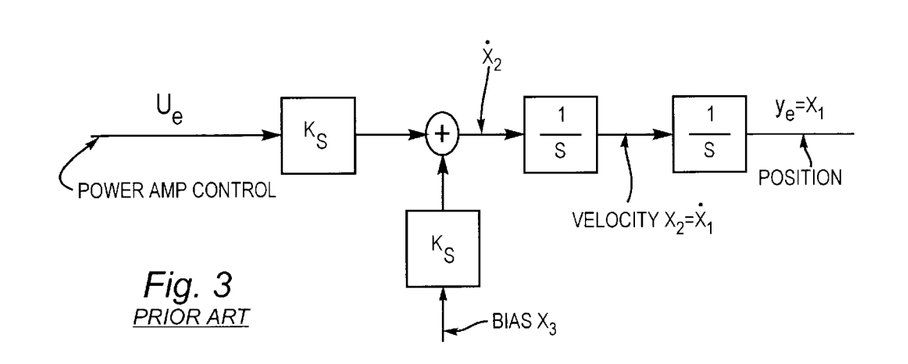
FIG. 3 is a block diagram of a continuous state estimator model.

The estimator block 14 of FIG. 1 is a mathematical model of the VCM actuator block 12. It is known in the art to employ a third-order continuous (analog) state estimator model, such as the model shown in FIG. 3. In FIG. 3, $K_s$ represents overall actuator gain. The actuator gain $K_s$ includes the gain scale factor of the digital-to-analog converter circuit (D/A), the power amplifier gain, the VCM torque constant, the VCM inertia, and the radius distance from the rotary actuator arm pivot point to the read/write head. The "+" symbol denotes summation of the input signals. The "1/s" symbol is a Laplace transform symbol denoting integration of the input signal.

The three variables comprising the state are defined as follows: $\hat{x}_1$ is the estimated position $y_e$; $\hat{x}_2$ is the estimated velocity; and $\hat{X}_3$ is the estimated bias torque, a constant, due to friction. The symbol $u_e$ denotes the power amplifier control signal used in the estimator 14. Differentiating the state variables with respect to time yields the following continuous state estimator dynamic equations:

$$\frac{d\hat{x}_1}{dt} = \hat{x}_2$$

$$\frac{d\hat{x}_2}{dt} = K_s\hat{x}_3 + K_s U_e$$

$$\frac{d\hat{x}_3}{dt} = 0$$

In vector form the three equations can be written as one:

$$\begin{vmatrix} \frac{d\hat{x}_1}{dt} \\ \frac{d\hat{x}_2}{dt} \\ \frac{d\hat{x}_3}{dt} \end{vmatrix} = \begin{vmatrix} 0 & 1 & 0 \\ 0 & 0 & K_s \\ 0 & 0 & 0 \end{vmatrix} \begin{vmatrix} \hat{X}_1 \\ \hat{X}_2 \\ \hat{X}_3 \end{vmatrix} + \begin{vmatrix} 0 \\ K_s \\ 0 \end{vmatrix} U_e$$

Alternatively, $X_e = F_e X_e + G_e u_e$, and $y_e = H_e X_e$, where $$H_e = |100|. \quad (1)$$

It is also known in the art to convert the continuous state estimator model of FIG. 3 to a discrete (digital) state estimator model for microprocessor implementation. Allowing for computation delay (which is defined as the time between the PES becoming available at the A/D input and the control signal becoming available at the D/A output), the discrete version of the model described by equation (1) is given by equation (2).

Thus, $$X_e(k+1) = \Phi_e X_e(k) + \Gamma_e U_e(k) \quad Y_e(k) = H_e X_e(k) \quad (2)$$

$X_e$, $\Phi_e$, $\Gamma_e$, and $H_e$ are matrices with dimensions 4×1, 4×4, 4×1, and 1×4, respectively. The calculation of $\Phi_e$ and $\Gamma_e$ based on the continuous model given in equation (1) is known in the art. Equation (2) mathematically predicts the three states (position, velocity, and bias) of the next servo sample k+1 for each servo sample k. The prediction is based on the estimated states and control signal of the present servo sample k. Equation (2) is modified by including a correction factor based on the measured position y. The result, given in equations (3) and (4), is an estimate of the states at servo sample k+1 that is based on the sum of a mathematical prediction of the states at k+1 and an error-correction component.

$$\overline{X}(k+1) = \Phi_e \hat{X}(k) + \Gamma_e U_e(k) \quad (3)$$

$$\hat{X}(k+1)=\bar{X}(k+1)+L(y(k+1)-H_e\bar{X}(k+1)) \quad (4)$$

$\bar{X}(k)$ is a 4×1 vector with components $\bar{x}_1(k), \bar{x}_2(k), \bar{x}_3(k)$, and $u_e(k-1)$ Similarly, $\hat{X}(k)$ has components $\hat{x}_1(k), \hat{x}_2(k), \hat{x}_3(k)$, and $u_e(k-1)$. The error-correction component includes a design constant with dimensions 4×1, denoted L, which approximates estimator gain. The components of the vector L are $l_1, l_2, l_3$ and 0.

Figure 4:
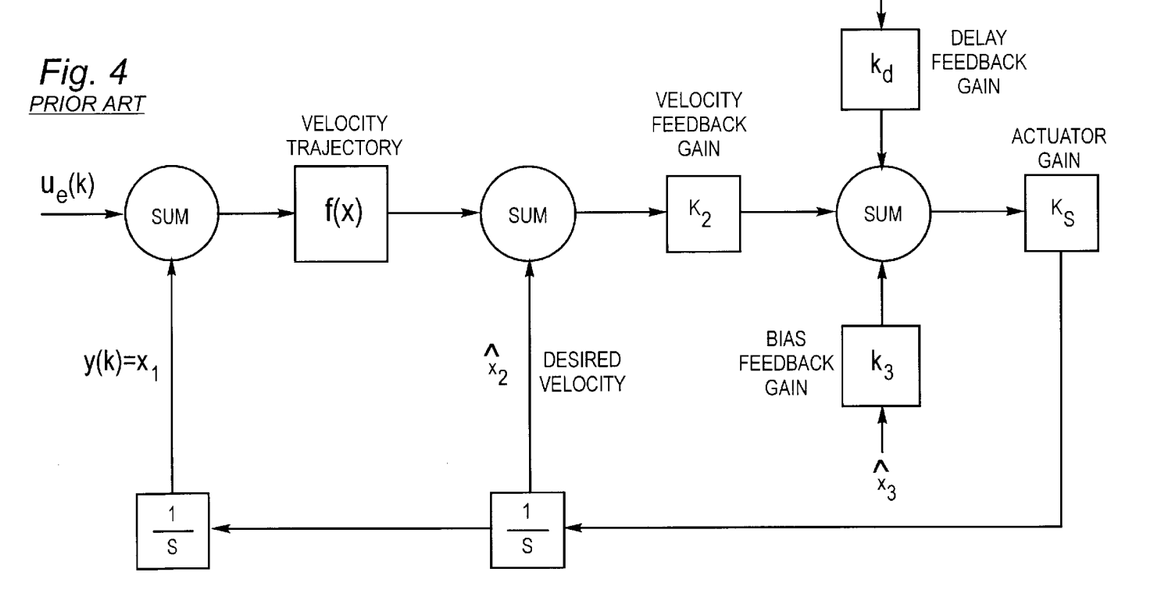
FIG. 4 is a block diagram of the continuous state estimator model of FIG. 3 using a controller that is fed back into the estimator model.

The controller block 16 of FIG. 1 is also known. A model for the controller block 16 is shown in FIG. 4. The model uses the estimated position, estimated velocity, and estimated bias to form the estimated control signal $u_e$. The velocity trajectory f(x), velocity feedback $k_2$, bias feedback $k_3$, and delay feedback $k_d$ are selected according to conventional design methods. Thus, $$u_e(k)=-k_2(f(\hat{x}_1(k))-\hat{x}_2(k))-k_3\hat{x}_3(k)-k_d u_e(k-1) \quad (5)$$

With reference once again to FIG. 1, the runout compensator block 18 can be used during track seeking in a preferred embodiment of the invention. During seeking, the runout compensator block 18 functions as a free-running oscillator at runout frequency ω. The runout compensator block 18 is described by the following equations:

$$x_a(k+1)=x_b(k) \quad (6)$$

$$x_b(k+1)=-x_a(k)+\alpha x_b(k) \quad (7)$$

α is a design constant that is a function of the runout frequency ω and the servo sampling time T. Namely, $$\alpha=2\cos(\omega T) \quad (8)$$

The runout compensator block 18 of FIG. 1 generates an output signal $x_a(k)$ based on the runout state equations (6) and (7). The signal $x_a(k)$ is added to the control signal $u_e(k)$, as shown in FIG. 1, to compensate for runout in the position signal y(k). Thus, $$u_p(k)=u_e(k)+x_a(k) \quad (9)$$

The values of $x_a(k)$ and $x_b(k)$ must be initialized at the start of each seek to ensure that the $x_a(k)$ generated by the runout compensator block 18 will have the requisite magnitude and phase values to compensate for runout. The initialization is accomplished by using the measured position y(k) as the input to the runout equations, as shown in FIG. 1, during track following. This procedure yields the following equations:

$$x_a(k+1)=x_b(k)-k_{1r}y(k) \quad (10)$$

$$x_b(k+1)=-x_a(k)+\alpha x_b(k)-(\alpha k_{1r}+k_{2r})y(k) \quad (11)$$

Selection of the poles $k_{1r}$ and $k_{2r}$ for both continuous and discrete implementation is known in the art. Thus, letting $$m_2=\alpha k_{1r}+k_{2r} \quad (12)$$

yields the following equation:

$$x_b(k+1)=-x_a(k)+\alpha x_b(k)-m_2 y(k) \quad (13)$$

During track following, equations (10) and (13) operate in closed-loop fashion. As discussed above, y(k) is used to generate $x_a(k)$, which is fed into the power amplifier of the VCM actuator block 12 of FIG. 1. This forces the VCM to track unknown runout. During track seeking, equations (6) and (7) operate with initial conditions set at the end of the prior track following. Thus, provided the runout is constant across the surface of the disk, $x_a(k)$ will always have the requisite compensatory magnitude and phase values such that y(k) will correspond to track centerline, or zero.

In operation, assuming constant RRO across the surface of the disk, the microprocessor performs the following steps. First, the microprocessor synchronizes with the hardware by obtaining the measured position y(k). Second, the microprocessor forms the estimator error, which is the difference between the measured and estimated positions. Thus, $$esterr(k)=y(k)-\bar{x}_1(k).$$

Third, the microprocessor corrects the estimated position, estimated velocity, and estimated bias, using the estimator error and the estimator gains $l_1$, $l_2$, and $l_3$. Thus, $$\hat{x}_1(k) = \bar{x}_1(k) + l_1 esterr(k)$$

$$\hat{x}_2(k) = \bar{x}_2(k) + l_2 esterr(k)$$

$$\hat{x}_3(k) = \bar{x}_3(k) + l_3 esterr(k)$$

Fourth, as shown in FIG. 4, the microprocessor calculates the estimator control signal $u_e(k)$ based on the estimator position $\bar{x}_1(k)$, estimator velocity $\bar{x}_2(k)$, estimator bias $\bar{x}_3(k)$, velocity feedback gain $k_2$, bias feedback gain $k_3$, and control delay gain $k_d$:

$$u_e(k)=-k_2(f(\hat{x}_1(k))-\hat{x}_2(k))-k_3\hat{x}_3(k)-k_d u_e(k-1)$$

Fifth, the microprocessor adds the estimator control signal $u_e(k)$ to the runout compensator signal $x_a(k)$ to obtain the power amplifier control signal $u_p(k)$. Sixth, the microprocessor sends $u_p(k)$ to a D/A converter circuit. Seventh, the microprocessor uses the mathematical estimator model ($\Phi_e$, $\Gamma_e$), to estimate the position, velocity, and bias for the next servo sample. Eighth, the microprocessor determines whether it is in the track seeking or track following mode. It is in the track following mode when y(k) is within one-half-track of the target track centerline. Otherwise, the microprocessor operates in the track seeking mode. In the track seeking mode, the following equations are executed:

$$x_a(k+1)=x_b(k)$$

$$x_b(k+1)=-x_a(k)+\alpha x_b(k)$$

In the track following mode, the following equations are executed instead:

$$x_a(k+1)=x_b(k)-k_{1r}y(k)$$

$$x_b(k+1)=-x_a(k)+\alpha x_b(k)-m_2 y(k)$$

If the disk drive employs a single microprocessor for both servo and interface controller functions, the microprocessor can execute the interface code while waiting for the next servo sample. On the other hand, if a dual-microprocessor design is utilized, the servo processor can either be idle, to save power, or perform housekeeping tasks while waiting for the next servo sample.

The above equations must be modified to compensate for RRO that varies with time or position on the surface of the disk. To this end a calibration is performed during track following at various idle times such as power up, cartridge insertion, and periodic moments when the disk drive is not engaged in read/write operations. In a preferred embodiment, the surface of the disk is divided into ten concentric zones. The servo therefore track follows at eleven preselected boundary tracks, using the runout state $x_a$ to determine the runout magnitude and the runout phase.

Calibration at each preselected track takes approximately sixty-four milliseconds; thus, the entire calibration process takes about one second. In a preferred embodiment, the signal $x_a$ is a sinusoidal waveform with a frequency of sixty hertz, corresponding to 3600 disk revolutions per minute. During normal operation, the servo code at the beginning of a track seek interpolates between the runout magnitude and phase at present and target tracks to adjust $x_a$ and $x_b$ accordingly.

Figure 5:
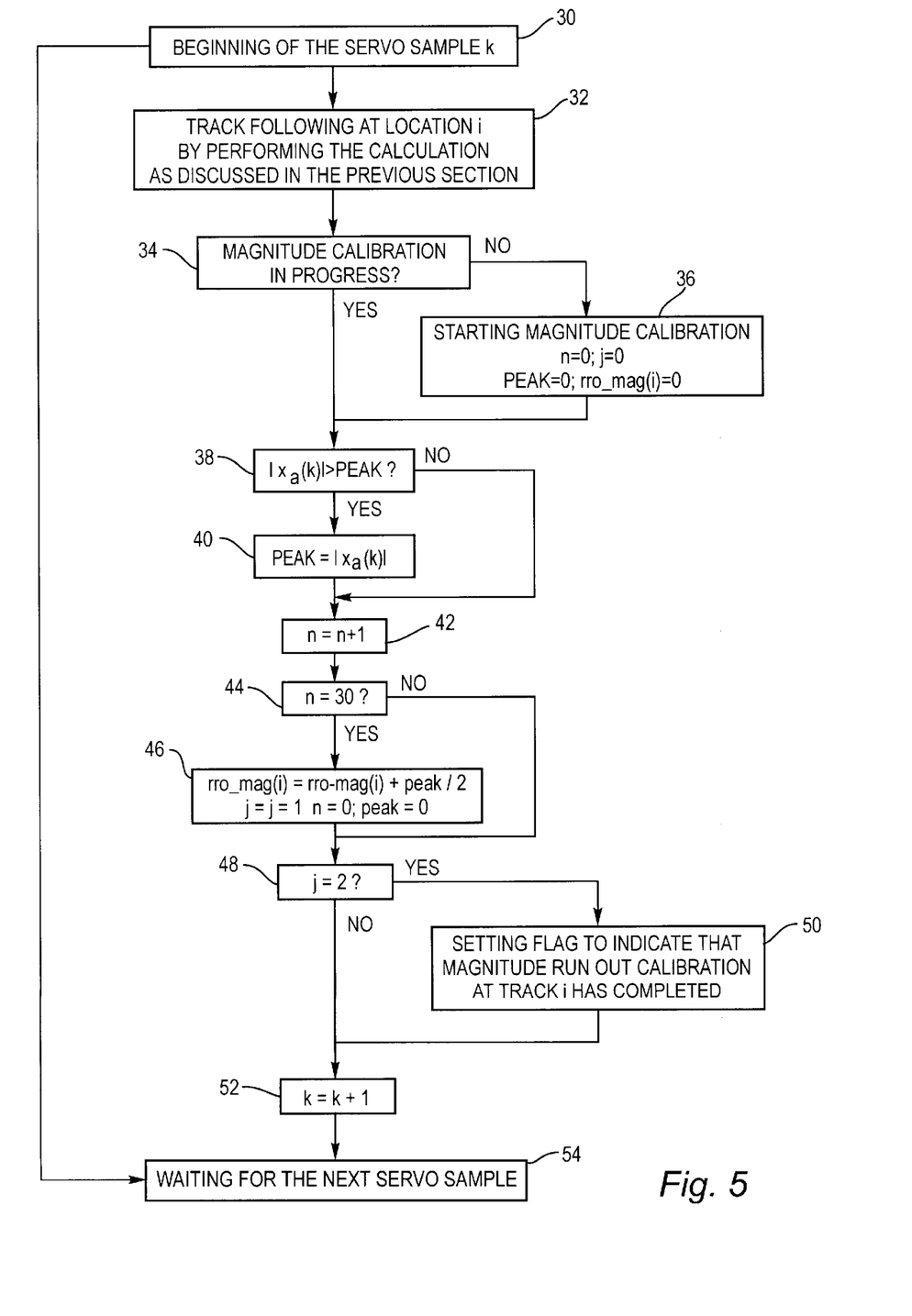
FIG. 5 is a flow chart of a calibration algorithm for determining runout magnitude.

FIG. 5 shows a flow chart for a calibration algorithm that determines the runout magnitude at each preselected track i. The servo track follows at each preselected calibration track i and executes the previously described runout state calculations. Two peak values j of the runout state $x_a$ are detected and averaged to determine the runout magnitude. The preferred servo system uses sixty servo sectors (sampling locations on a given data track) n per revolution of the disk. As shown in FIG. 5, one peak is obtained within each thirty servo sectors, so n is reset to zero each time it reaches thirty; otherwise, n corresponds to k, the number of samples. One revolution of the disk is required for calibration at each track i. The eleven runout magnitude values are stored for use during normal operations.

The function of each block depicted in the flow chart of FIG. 5 is discussed in greater detail for a preferred embodiment. In the block designated 30, the servo system prepares to perform a given servo sample k. In block 32 the servo maintains the read/write heads at one of the eleven preselected boundary tracks i. While the servo track follows, the previously described runout state calculations are executed. The servo then determines in block 34 whether magnitude calibration is in progress. If magnitude calibration is not in progress, the servo begins magnitude calibration by initializing the variables n, j, peak, and rro_mag(i) to zero as shown in block 36. The variable n corresponds to the number of servo samples performed en route to obtaining a peak value, designated peak, of the runout state $x_a(k)$. As discussed above, thirty samples n are necessary to obtain the peak value, and two peak values are obtained so that an average can be taken. Thus, j, which records the number of peak values obtained, can have a value of zero, one, or two. The variable rro_mag(i) denotes the runout magnitude at preselected calibration track i.

In block 38 of FIG. 5, the absolute value of the runout state $x_a(k)$ is compared to peak. If the absolute value of the runout state $x_a(k)$ is not greater than peak, n is incremented by one as shown in block 42. Otherwise, peak is first set equal to the absolute value of the runout state $x_a(k)$ as shown in block 40. In block 44 the servo determines whether n is thirty. If n is thirty, one peak value has been obtained, and the servo reinitializes n and peak to zero, increments j by one, and increments rro_mag(i) by one-half of peak as shown in block 46. Then, or if n is less than thirty, the servo determines in block 48 whether j is two. If j is not yet two, then two peak values have not yet been obtained, so the servo increments k by one, as shown in block 52, and waits for the next servo sample k, as shown in block 54. Otherwise (i.e., if j is two), the servo first sets a flag to indicate that runout magnitude calibration at track i has been completed, as shown in block 50, and then proceeds to the task of block 52.

Figure 6:
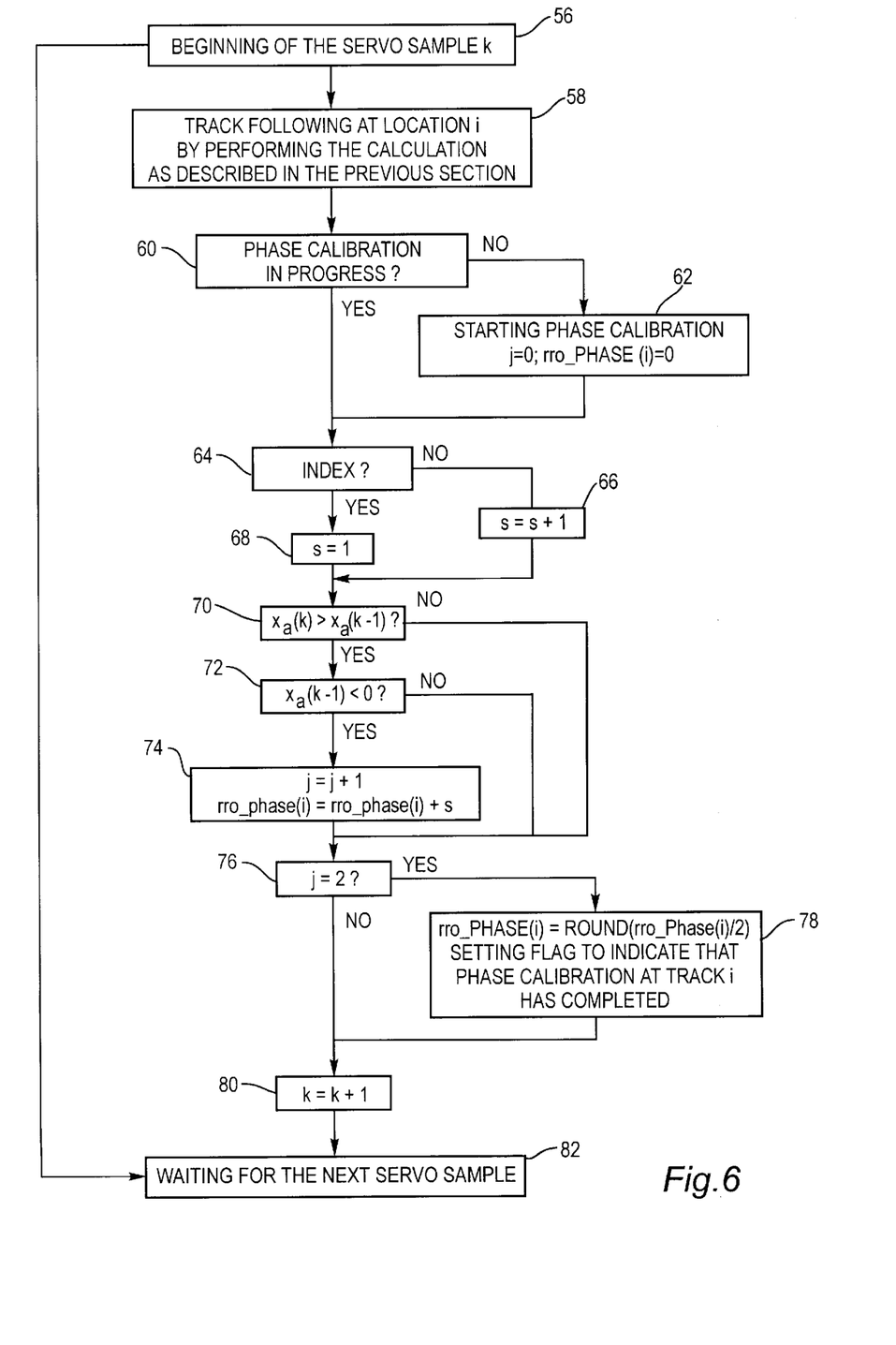
FIG. 6 is a flow chart of a calibration algorithm for determining runout phase.

FIG. 6 shows a flow chart for a calibration algorithm that determines the runout phase at each preselected track i. During track following at each preselected calibration track i, the servo detects a servo sector number s, referenced from an index servo sector s=1, at which the $x_a$ signal has a magnitude of zero and a positive slope. This process is repeated during a second revolution to detect an additional crossover point. The runout phase is determined by averaging the two crossover points. Thus, the phase calibration requires two revolutions to complete. The number of samples k goes up to 120 in FIG. 6, while s, which otherwise corresponds to k, is reset to one each time s reaches sixty.

The function of each block depicted in the flow chart of FIG. 6 is discussed in greater detail for a preferred embodiment. In the block designated 56, the servo system prepares to perform a given servo sample k. In block 58 the servo maintains the read/write heads at one of the eleven preselected boundary tracks i. While the servo track follows, the previously described runout state calculations are executed. The servo then determines in block 60 whether phase calibration is in progress. If phase calibration is not in progress, the servo initiates phase calibration by setting the variables n and rro_phase(i) equal to zero as shown in block 62. The variable j corresponds to the number of servo sector points detected at which the runout signal $x_a(k)$ has a magnitude of zero and a positive slope. As discussed above, the detected servo sector point is referenced from an index servo sector number s (which is initially set to one), and sixty servo samples are required to detect the first of two such servo sector points, the average of which is used to perform the runout phase calibration. Thus, j can have a value of zero, one, or two. The variable rro_phase(i) denotes the runout phase at preselected calibration track i.

In block 64 of FIG. 6, the servo system determines whether the index s is sixty. If s is less than sixty, the servo increments s by one as shown in block 66. If, on the other hand, s is sixty, the servo initializes s to one as shown in block 68. Next, the servo determines in block 70 whether the runout signal for the present sample, $x_a(k)$, is greater than the runout signal for the prior sample, $x_a(k-1)$. If the answer is no, the servo determines whether j is two as shown in block 76. If instead the answer is yes, the servo determines in block 72 whether the runout signal for the prior sample, $x_a(k-1)$, has a negative value. If $x_a(k-1)$ is positive or zero, the servo determines in block 76 whether j is two. If, however, $x_a(k-1)$ is negative, the servo increments j by one and increments rro_phase(i) by the value of s as shown in block 74. Then the servo asks if j is two as shown in block 76. At block 76, if j is not yet two, then two crossover servo sector points have not yet been detected, so the servo increments k by one, as shown in block 80, and waits for the next servo sample k, as shown in block 82. Otherwise (i.e., if j is two), the servo first sets rro_phase(i) equal to the nearest integer value of rro_phase(i) divided by two and sets a flag to indicate that runout phase calibration at track i has been completed, as shown in block 82, and then proceeds to the task of block 80.

In a preferred embodiment, the difference between the runout magnitude and phase at a given target data track and the runout magnitude and phase at the present track is determined at the beginning of the seek. The values of $x_a$ and $x_b$ are then initialized accordingly. For runout magnitude variation, the values of $x_a$ and $x_b$ used at the beginning of the seek are determined by linear interpolation. Thus, the $x_a$ and $x_b$ values from the previous track following sample are multiplied by the ratio of the target and present runout magnitudes. For phase variation, the servo code freezes the $x_a$ and $x_b$ values for a number of servo samples that is proportional to the amount of the phase variation. For example, for a phase lead of about thirty degrees, the microprocessor freezes $x_a$ and $x_b$ for the first five samples of the seek, commencing execution of the previously discussed equations at sample number six. Similarly, for a thirty degree phase lag, the microprocessor inverses the $x_a$ and $x_b$ values and freezes them for twenty-five (thirty minus five) samples at the beginning of the seek.

In performing the above seeking algorithm, the microprocessor calculates the target runout magnitude and phase using the calibrated values as discussed. The microprocessor then determines the zone in which the target track, or cylinder, resides. The microprocessor then linearly interpolates between the calibrated values at the beginning and the end of the zone to obtain the target values for runout magnitude and phase. Thus, target_mag=[(rro_mag(i+1)−rro_mag(i))target_cyl]/N, and target_phase=[(rro_phase(i+1)−rro_phase(i))target_cyl]/N, where:

target_cyl denotes target track, or cylinder;

target_mag denotes runout magnitude at the target cylinder;

rro_mag(i+1) denotes runout magnitude at the end of the zone;

rro_mag(i) denotes runout magnitude at the beginning of the zone;

N denotes number of tracks within a zone;

target_phase denotes runout phase at the target cylinder;

rro_phase(i+1) denotes runout phase at the end of the zone; and rro_phase(i) denotes runout phase at the beginning of the zone.

The microprocessor then adjusts $x_a$ and $x_b$ based on the runout magnitude variation. Thus, $x_a(k)=x_a(k)$[target_mag/present_mag], and $x_b(k)=x_b(k)$[target_mag/present_mag].

The microprocessor also calculates the phase variation phase_var based on the present and target phases. Thus, phase_var=target_phase−present_phase, where present_mag and present_phase are the runout magnitude and phase at the present track, as determined at the beginning of the previous seek. When the next servo sample arrives, the microprocessor starts performing the eight steps previously discussed. However, the microprocessor begins executing the runout state equations only after a number of samples necessary to compensate for the runout phase variation have taken place.

Thus, a method for applying an optimal seeking technique to a disk file with excessive repeatable runout is disclosed which (1) modifies the control signal during seeking, (2) determines the runout magnitude and phase at various tracks, and (3) compensates for the relative magnitude and phase variations between the originated and target tracks. While preferred embodiments have been shown and described, it will be apparent to one of ordinary skill in the art that numerous alterations may be made without departing from the spirit or scope of the invention. Therefore, the invention is not to be limited except in accordance with the following claims.

What is claimed is:

1. A method for compensating for excessive repeatable runout error during servo seeking of a target data track by a read/write head, the read/write head carried by a rotary actuator arm driven by a voice-coil motor of a disk drive, the target data track residing on a surface of a disk contained in a removable cartridge housed within the disk drive, the method comprising the steps of:

initializing a runout state at the beginning of a seek, using the values of the phase and magnitude differences between the track where the read/write head is located and the target data track;

calculating a runout compensation signal during seeking, based on the runout state previously initialized; and modifying a control signal sent to the voice-coil motor with the runout compensation signal to compensate for the runout error during seek arrival at the target track.

2. The method of claim 1, wherein said calculating step is accomplished by executing oscillator equations continuously during seeking.

3. The method of claim 2, wherein the oscillator equations are:

$x_a(k+1)=x_b(k)$ and
   $x_b(k+1)=-x_a(k)+\alpha x_b(k)$, where
   k is the present servo sample;
   k+1 is the next servo sample;
   $x_a$ is the present runout compensation signal;
   $x_b$ is the previous runout compensation signal; and
   $\alpha$ is equal to $2\cos(\omega T)$, where $\omega$ is the runout frequency and T is the servo sampling time.

4. The method of claim 1, further comprising the step of obtaining two peak absolute values of the runout compensation signal and averaging the values to determine the runout magnitude.

5. The method of claim 1, further comprising the steps of detecting a first servo sector number at which the runout compensation signal has zero amplitude and positive slope, detecting a second servo sector number at which the runout compensation signal has zero amplitude and positive slope, and averaging the two detected servo sector numbers to determine the runout phase.

6. The method of claim 1, further comprising the steps of determining the runout magnitude of the target data track and compensating for the relative variation between the runout magnitude at the present data track and the runout magnitude at the target data track.

7. The method of claim 1, further comprising the steps of determining the runout phase at the target data track and compensating for the relative variation between the runout phase at the present data track and the runout phase at the target data track.

8. A method for compensating for excessive repeatable runout error during servo seeking of a target data track by a read/write head, the read/write head carried by a rotary actuator arm driven by a voice-coil motor of a disk drive, the target data track residing on a surface of a disk contained in a removable cartridge housed within the disk drive, the method comprising the generating an estimator signal from a comparison of the estimated position, velocity, and bias torque of the read/write head to the measured position, velocity, and bias torque of the read/write head;

generating an estimated control signal within a controller block, based on the estimator signal;

generating a runout compensation signal continuously during seeking with oscillator equations;

adding the estimated control signal to the runout compensation signal to create a power amplifier signal which compensates for runout; and sending the power amplifier signal to the voice-coil motor to adjust the rotary actuator arm accordingly.

9. A method for compensating for excessive repeatable runout error during servo seeking of a target track by a read/write head, the read/write head carried by a rotary actuator arm driven by a voice-coil motor of a disk drive, the target data track residing on a surface of a disk contained in a cartridge housed within the disk drive, the method comprising the steps of:

initializing a runout state at the beginning of a seek by determining runout magnitude of the target data track on the surface of the disk by multiplying a pair of runout states by a ratio of the runout magnitude at the target track and the runout magnitude at the present track, the ratio utilizing values obtained during a previous target data track seek;

calculating a runout compensation signal during seeking, based on the runout state previously initialized;

modifying a control signal sent to the voice-coil motor with the runout compensation signal to compensate for the runout error during seek arrival at the target track; and     compensating for the relative variation between the runout magnitude at the present data track and the runout magnitude at the target data track by performing linear interpolation.

10. A method for compensating for excessive repeatable runout error during servo seeking of a target track by a read/write head, the read/write head carried by a rotary actuator arm driven by a voice-coil motor of a disk drive, the target data track residing on a surface of a disk contained in a cartridge housed within the disk drive, the method comprising the steps of:

initializing a runout state at the beginning of a seek by determining runout phase of the target data track on the surface of the disk by freezing the runout states for a number of servo samples that is proportional to the determined amount of phase variation;

calculating a runout compensation signal during seeking, based on the runout state previously initialized;

modifying a control signal sent to the voice-coil motor with the runout compensation signal to compensate for the runout error during seek arrival at the target track; and     compensating for the relative variation between the runout magnitude at the present data track and the runout magnitude at the target data track by performing linear interpolation.

11. A method for compensating for excessive repeatable runout error during servo seeking of a target data track by a read/write head, the read/write head carried by a rotary actuator arm driven by a voice-coil motor of a disk drive, the target data track residing on the surface of a disk contained in a removable cartridge housed within the disk drive, the method comprising the steps of:

generating an estimator signal from a comparison of the estimated position, velocity, and bias torque of the read/write head to the measured position, velocity, and bias torque of the read/write head;

generating an estimated control signal within a controller block, based on the estimator signal;

generating a runout compensation signal with oscillator equations based on a runout state initialized at the beginning of a seek;

adding the estimator control signal to the runout compensation signal to create a power amplifier signal which compensates for runout;

sending the power amplifier signal to the voice-coil motor to adjust the rotary actuator arm accordingly;

determining runout magnitude and runout phase at the present data track on the surface of the disk;

determining the runout magnitude at the target data track;

compensating for the relative variation between the runout magnitude at the present track and the runout magnitude at the target data track;

determining the runout phase at the target data track; and     compensating for the relative variation between the runout phase at the present track and the runout phase at the target data track.

* * * * *

UNITED STATES PATENT AND TRADEMARK OFFICE
CERTIFICATE OF CORRECTION

PATENT NO : 5,886,846
DATED : March 23, 1999
INVENTOR(S): Ich Pham, David Drouin, Evelyn Howard It is certified that error appears in the above-identified patent and that said Letters Patent are hereby corrected as shown below:

Column 4, line 39, that portion reading "$X_c=$" should read -- $\dot{X}_c=$ --.

Column 4, line 41, that portion reading "$|100|$" should read -- $|1\ 0\ 0|$ --.

Column 4, line 51, that portion reading:
"$X_c(k+1)=\Phi_c X_c(k)+\Gamma_c U_c(k)\ Y_c(k)=H_c X_c(k)$", should read:

-- $X_c(k+1)=\Phi_c X_c(k)+\Gamma_c U_c(k)$
$Y_c(k)=H_c X_c(k)$ --

Column 5, line 8, that portion reading "$_1$" should read -- $l_1$ --.

Column 6, line 47, that portion reading "$_{xb}(k)$" should read -- $x_b(k)$ --.

Signed and Sealed this

Fourteenth Day of December, 1999

Attest:

Q. TODD DICKINSON

*Attesting Officer*   *Acting Commissioner of Patents and Trademarks*